Figure 1:
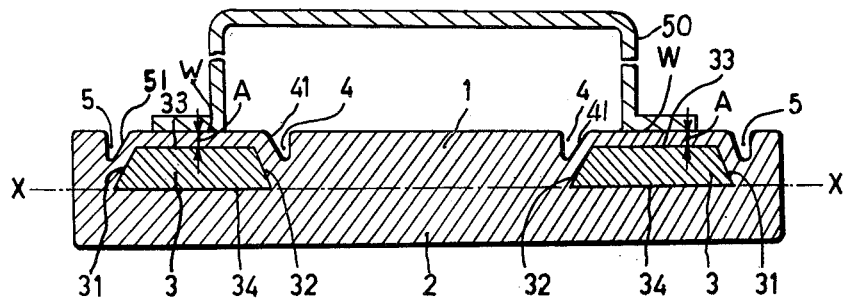

Jan. 25, 1966  E. T. F. GRAHAM  3,231,343
PRESSURE WELDED ARTICLE
Filed Oct. 4, 1962

INVENTOR
EVAN TREVOR FREDERICK GRAHAM
BY
AGENT

United States Patent Office 3,231,343
Patented Jan. 25, 1966

3,231,343
PRESSURE WELDED ARTICLE
Evan Trevor Frederick Graham, Cleethorpes Line, England, assignor to North American Philips Company Inc., New York, N.Y., a corporation of Delaware
Filed Oct. 4, 1962, Ser. No. 228,321
7 Claims. (Cl. 29—191.4)

This invention relates to pressure welded articles and more specifically to articles comprising metallic parts which are joined to one another by pressure welding. Though not limited to its application thereto, the invention is primarily intended for and particularly advantageous for the manufacture of sealed housings for transistors and other semi-conductor devices.

In many cases, for example, in the case of some semiconductor device housings, it is required to join together by pressure welding metal parts which are of dissimilar thickness of metal. Such housings, for example, commonly comprise a cover member which is pressure welded to a base member of considerably greater thickness of metal than the cover member.

It is a general principle in the technique of pressure welding (which term is herein used in its customary sense of meaning either cold pressure welding or pressure welding with the application of supplementary heating well below that necessary alone to achieve welding) that, to achieve a good weld, the two parts which are to be welded together should be of the same, or at any rate similar, thickness and be deformed in accordance with the figure of merit appropriate to the metal of the parts being welded together. If parts of dissimilar thicknesses are pressure welded together, considerable and undesirable distortion of the thicker part usually occurs. The present invention seeks to avoid this defect.

According to this invention, an article including two metallic parts which are pressure welded together and which are of substantially different thicknesses where they are welded together is characterized in that the part which is of greater thickness is provided, in the neighbourhood of the weld, with a totally enclosed insert of material of greater resistance to deformation than the rest of the material of said part, said insert being so positioned in the part by which it is enclosed as to leave between itself and the weld, a thickness of metal at least approximately equal to the thickness of metal, on the other side of the weld, of the part of lesser thickness.

According to a feature of this invention, a housing comprising a cover member which is pressure welded to a base member of greater thickness than the cover member in the neighbourhood of the weld is characterized in that said base member is provided, in the neighbourhood of the weld, with a totally enclosed insert made of metal of higher resistance to deformation than the rest of the metal of said base member, said insert being so positioned therein that the thickness of metal between itself and the weld is at least approximately equal to the thickness of metal of the cover member on the other side of the weld.

Where the metal parts pressure welded together are of copper or material of like hardness, a suitable material for the insert is stainless steel. Thus, to take a common case where there is a more or less cylindrical cover member pressure welded to an approximately circular base, the said base could be provided with a stainless steel ring insert wholly enclosed in the metal thereof and so positioned on one side of the weld as to leave the thickness between itself and the weld approximately equal to the thickness of the cover member on the other side of the weld.

Preferably the metal part having the insert therein is grooved on the face towards the weld outwardly and/or inwardly (preferably both) of the insert to facilitate flowing of the metal due to reduction of area caused by welding. In one arrangement of this nature where the insert is a ring, the said insert has the section of a trapezoid with sloping faces making approximately equal angles with the two parallel faces and there are two ring-like recesses one inwardly of and one outwardly of the ring insert, each recess having one face substantially parallel to an adjacent face of the trapezoid and spaced therefrom by approximately the same thickness of metal as that by which the smaller of the two parallel faces of the trapezoid is spaced from the weld.

An important feature of the invention lies in the fact that the deformation-resisting insert is wholly enclosed for, as a result of this, corrosion troubles due to junctions of dissimilar metals (the insert and the metal by which it is enclosed) under conditions of humidity are avoided.

The total enclosure of the insert can be effected in any of a variety of ways, e.g. by pressure die casting. An at present preferred method, however, consists in forming the part which encloses the insert in two portions co-operatively formed, so as, when assembled together, to provide a space to accommodate the insert, and then joining the said two portions together with the insert between them in said space.

The invention is illustrated in the drawings accompanying the specification which show a base member, formed in accordance with this invention, of a housing for a transistor or the like, the said housing comprising a cover "can" which is welded thereto. FIGURE 1 is a cross sectional elevation of the base member with the cover in position for welding, and FIGURE 2 a plan view of the base member.

Referring to the drawings, the base member therein shown consists of two portions 1 and 2 of pressure weldable copper which are fixed together and totally enclose between them a stainless steel ring insert 3 shown cross hachured in FIGURE 1. The plane of juncture between the two portions 1 and 2 is indicated by the chain line X—X and as will be seen the portion 1 is recessed to accommodate the ring insert 3. This ring insert is of trapezoidal section with sloping faces 31, 32 making equal angles with the parallel faces 33 and 34. The two portions 1 and 2 with the ring insert between them are fixed together in any convenient well known way. The ring insert is thus positioned below the upper surface of the part 1 and separated therefrom by a predetermined thickness of metal indicated by the dimension A, the thickness of the copper at this dimension being approximately the same as the thickness of the cover member 50 to be pressure welded to the base. The pressure weld is, of course, formed over the annular surface marked W.

Figure 2:
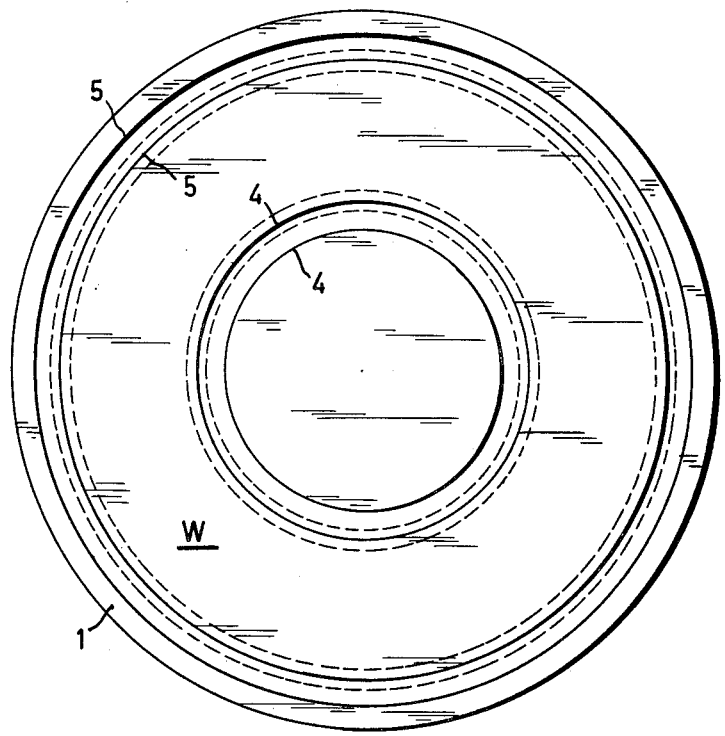

The portion 1 is formed with two ring recesses or grooves 4 and 5 inwardly and outwardly of the ring insert. The groove 5 has a sloping face 51 substantially parallel to the face 31 of the insert and the groove 4 similarly has a sloping face 41 substantially parallel to the sloping face 32 of said insert. The separation between the faces 41 and 32 is made approximately equal in each case to the dimension A. The grooves are for the purpose of allowing the metal to flow due to the reduction of area caused by pressure welding when the cover member is welded on. In FIGURE 2 the upper corners of the grooves are shown in full lines referenced 5 for the outer groove and 4 for the inner groove, and the corners of the trapezoidal insert are represented by the broken line circles.

What is claimed is:
1. A pressure-welded enclosure comprising two metallic members with abutting portions pressure welded to- gether to form a sealed housing, the portion of one of said members at the weld being of substantially greater thickness than the corresponding portion of the other member, said portion of said other member being of pressure-weldable material, said portion of said one member at the weld comprising a first part of pressure-weldable material and a second insert part of material substantially harder than the pressure-weldable material and wholly enclosed within the latter and extending directly underneath the weld with a layer of the pressure-weldable material disposed directly between the said harder insert and the weld, said layer of pressure-weldable material having a thickness at least approximately equal to the thickness of said portion of said other member on the opposite side of the weld, whereby deformation or distortion of the thicker member during the welding process is minimized.

2. A pressure-welded article as set forth in claim 1 wherein regions of said first part adjacent the harder insert contain a groove to facilitate flowing of the metal during the welding.

3. A pressure-welded article as set forth in claim 1 wherein said one member comprises a pair of elements of said pressure-weldable material bonded together and to the said insert part on opposite sides thereof.

4. A pressure-welded sealed enclosure comprising two metallic members with annular abutting portions pressure welded together to form an interior cavity for housing a semiconductor device, the portion of one of said members at the weld being of substantially greater thickness than the corresponding portion of the other member, said portion of said other member being of pressure-weldable material, said portion of said one member at the weld comprising a first annular part of pressure-weldable material and a second annular insert part of material substantially harder than the pressure-weldable material and wholly enclosed within the latter and extending directly underneath the weld with a layer of the pressure-weldable material disposed directly between the said harder insert and the weld, said layer of pressure-weldable material having a thickness approximately equal to the thickness of said portion of said other member on the opposite side of the weld, whereby deformation or distortion of the thicker member during the welding process is minimized.

5. A pressure-welded enclosure as set forth in claim 4 wherein the said one member is a base member, and said other member is a cover member.

6. A pressure-welded enclosure as set forth in claim 4 wherein the pressure-weldable material is copper, and the insert is stainless steel.

7. A pressure-welded enclosure as set forth in claim 4 wherein the insert is a ring with a trapezoidal cross-section, and said first part contains ring-like recesses on opposite sides of the insert, each recess having a face extending substantially parallel to the adjacent face of the insert ring and spaced therefrom by a layer of pressure-weldable material of approximately the same thickness as that underneath the weld.

References Cited by the Examiner
UNITED STATES PATENTS

| | | | |
|---|---|---|---|
| 522,347 | 7/1894 | Martin | 29—191.6 |
| 1,005,142 | 10/1911 | Becker | 29—191.6 |
| 2,210,357 | 8/1940 | Beament | 29—191 |
| 3,020,454 | 2/1962 | Dixon | 29—470.1 |

DAVID L. RECK, *Primary Examiner.*

HYLAND BIZOT, BENJAMIN HENKIN, *Examiners.*